(No Model.)

R. F. H. HÖVET.
VEHICLE WHEEL.

No. 313,209. Patented Mar. 3, 1885.

Witnesses:
Sidney Mann
Carl Hay

Inventor:
Rudolph Fr. H. Hövet
by Goepel & Raegener
his Attorneys

UNITED STATES PATENT OFFICE.

RUDOLPH FRIEDRICH HERMANN HÖVET, OF HAMBURG, GERMANY.

VEHICLE-WHEEL.

SPECIFICATION forming part of Letters Patent No. 313,209, dated March 3, 1885.

Application filed December 15, 1884. (No model.)

*To all whom it may concern:*

Be it known that I, RUDOLPH FRIEDRICH HERMANN HÖVET, a subject of the Emperor of Germany, and a resident of Hamburg, in the German Empire, have invented certain new and useful Improvements in Wheels for Cars and other Vehicles, of which the following is a specification.

My invention relates to improvements in wheels for cars or other vehicles of that class which run either ordinarily on the rails of a tramway and leave the same occasionally for getting out of the way and for switching purposes, or which make use of the tramway-track only occasionally, and are driven usually otherwise; and the invention consists of a wheel for cars and other vehicles which is provided with a fixed grooved tire, and with a loose tire guided in the groove of the fixed tire, said loose tire being adapted to be lifted or lowered by means of fingers and suitable actuating mechanism, so as to be raised or lowered out of or into the groove of the rail.

Figure 1:
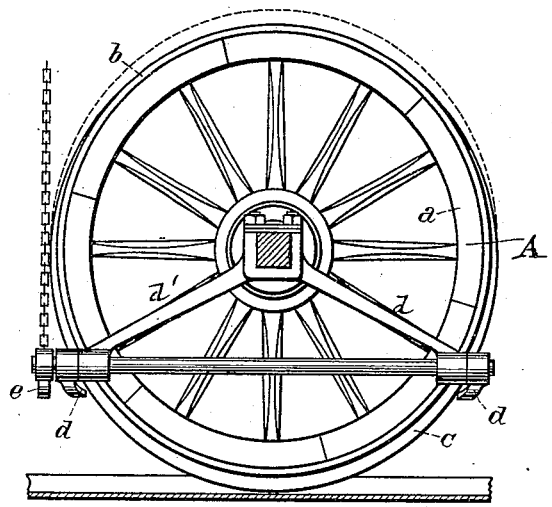
Figure 2:
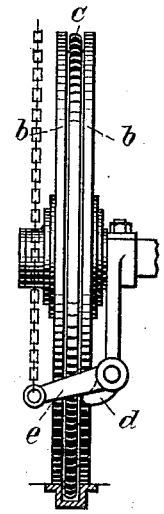
Figure 3:
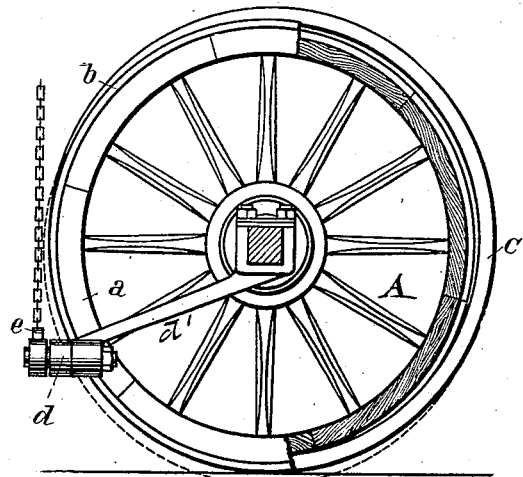

In the accompanying drawings, Figure 1 represents a side elevation of my improved wheel for cars and other vehicles. Fig. 2 is an end elevation of the same. Fig. 3 is a side elevation of the wheel, partly in section, showing a modification of the lifting device for the loose tire; and Fig. 4, a vertical transverse section of Fig. 3.

Similar letters of reference indicate corresponding parts.

Figure 4:
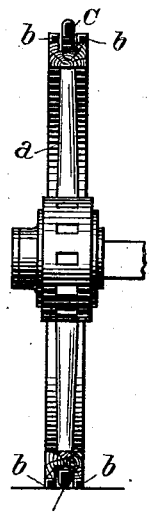

A in the drawings represents a wheel for cars and other vehicles, which is provided with two fixed tires, $b\ b$, and between the same with a loose tire, C, of larger exterior diameter than the fixed tires $b\ b$. A circumferential groove is cut into the rim of the wheel A between the tires. The inner diameter of the loose tire C is larger than the diameter of the circumferential groove, so that the tire enters the groove between the fixed tires $b\ b$ whenever the rim of the wheel A passes over flat or even ground, while the upper part of the loose tire projects above the upper part of the fixed tire $b\ b$, as shown in Figs. 3 and 4. When the wheel A runs on the track, the loose tire C enters the groove of the track-rail, so as to guide the vehicle thereon, as shown in Figs. 1 and 2.

Whenever it is desired to drive out of the track, the loose tire C is lifted. This may be effected either by means of fingers $d\ d$, which are arranged either before and behind the wheel, as shown in Fig. 1, or only before or behind the same, as shown in Fig. 3. The fingers $d$ are pivoted to inclined bars or arms $d'$, extending downward from the axle, and are raised or lowered by means of a lever, $e$, and a chain leading to the seat of the driver or platform of the car. When the loose tire C is lifted by means of two fingers, $d\ d$, in front and behind, it is raised vertically, as shown in dotted lines in Fig. 1, while when the tire is lifted by one finger only it is raised in a diagonal direction, as shown in Fig. 3. In either case the loose tire is raised out of the groove, so that the car or other vehicle can move out of the track without difficulty.

In place of the fixed tires $b\ b$, the rim of the wheel A may be provided with a groove tire; or the tires $b\ b$ may be made integral with the wheel, provided a groove is formed in the rim for receiving and guiding the loose tire.

Having thus described my invention, I claim as new and desire to secure by Letters Patent—

1. The combination, with a wheel for cars and other vehicles having fixed tires and a circumferential groove between the tires, of a loose tire guided in the groove between the fixed tires, and mechanism, substantially as described, applied to the lower part of the loose tire, and adapted for raising or lowering the same, substantially as set forth.

2. The combination of a wheel for cars and other vehicles having fixed tires and a circumferential groove between said tires, a loose tire guided in said groove, a finger or fingers applied to the lower part of the loose tire, and mechanism for raising or lowering said finger or fingers, substantially as set forth.

3. The combination of a wheel for cars and other vehicles having fixed tires and a circumferential groove between said tires, a loose tire guided in said groove, an inclined arm or arms attached to the axle, a finger or fingers pivoted to the lower ends of said arm or arms and applied to the lower part of the loose tire, and mechanism for raising or lowering the finger or fingers, substantially as set forth.

In testimony that I claim the foregoing as my invention I have signed my name, in presence of two witnesses, this 7th day of November, 1884.

RUDOLPH FRIEDRICH HERMANN HÖVET.

Witnesses:
ALEXANDER SPECHT,
DIEDRICH PETERSEN.